Nov. 1, 1927.
C. J. GILLEN
1,647,566
GUARD FOR ELECTRIC METERS
Filed March 20, 1926
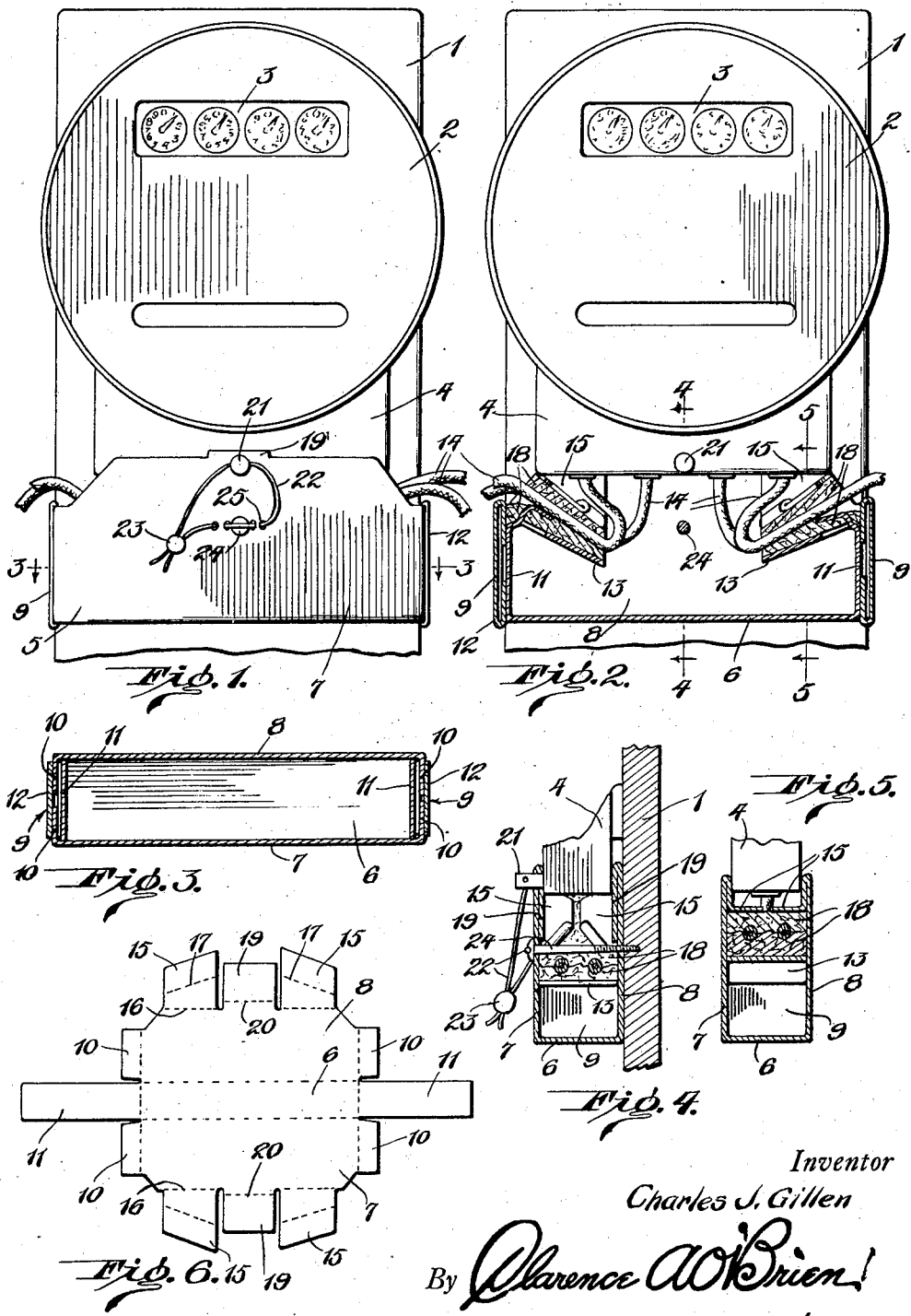
Inventor
Charles J. Gillen
By Clarence A. O'Brien
Attorney Patented Nov. 1, 1927.

1,647,566

UNITED STATES PATENT OFFICE.

CHARLES J. GILLEN, OF CARBONDALE, PENNSYLVANIA.

GUARD FOR ELECTRIC METERS.

Application filed March 20, 1926. Serial No. 96,280.

This invention relates to a guard for electric meters and particularly to the usual type of watt hour meter used in measuring electric currents supplied to houses, stores and the like.

An object of the invention resides in providing a guard for an electric meter which is adapted to protect the terminals of the meter and the wires adjacent thereto for preventing unauthorized persons from using the current from the supply line or source of power without its being recorded on the meter.

A further object of the invention resides in providing a guard for meters of the various types in present use which may be readily applied to the terminal blocks of the meter and held by the same seal that seals the meter for protecting the service and load wires attached thereto.

Another object of the invention resides in providing a guard for meters which may be constructed from stamped sheet material in order to produce a guard of an efficient character which is simple in construction, and may be manufactured at a low cost.

The invention comprehends numerous other objects residing in the details of construction of the guard which are more particularly pointed out in the following description and claims directed to a preferred form of the invention, it being understood, however, that various changes in the size, shape and relation of the parts may be made in order to provide a guard for different types of meters without departing from the spirit or scope of the invention as herein set forth.

In the drawing forming part of this application:

Figure 1 is a front elevation of a meter and the improved guard applied thereto.

Fig. 2 is a view similar to Fig. 1, showing the guard in vertical longitudinal section.

Fig. 3 is a sectional view taken on the line 3—3 of Fig. 1.

Fig. 4 is a sectional view taken on line 4—4 of Fig. 2.

Fig. 5 is a sectional view taken on line 5—5 of Fig. 2.

Fig. 6 is a view of a piece of stamped sheet material from which the guard is formed.

This invention is adapted for application to the usual electric light meter now in general use for measuring current supplied to consumers in houses, stores and the like, and includes a base indicated at 1 on which the meter 2 is mounted and which in its usual construction, is provided with an indicating dial structure at 3 by which the consumed current can be read.

This meter 2 is provided with a depending portion 4 housing the terminals for the wires which connect the meter to the service and the load. It has been found from experience in the operation of these electric meters, that it is not difficult to disconnect the wire from the meter after the same is sealed to indicate tampering, as a result of which considerable revenue is lost by electric power companies from the stealing of current by disconnecting the wires from the meter and using the current direct. In order to overcome this, and provide means whereby access to the connections with the meter are protected, the guard device of this invention has been designed with this result in view.

This guard is indicated generally at 5 and includes a bottom 6, front and rear side walls 7 and 8, respectively, and end walls 9. This guard is preferably formed of sheet material which may be cut so as to form the various parts thereof. In producing this guard from a piece of sheet material, the same may be suitably die stamped as indicated in Fig. 6 to provide a blank form from which the guard is formed by bending the various portions into proper shape.

The side walls 7 and 8 are integral with the bottom 6 as clearly shown in the drawing, being bent into the form as shown particularly in Figs. 4 and 5. The ends of the front and rear side wall portions are formed with extensions 10 shown clearly in Fig. 6 while the end portions of the bottom 6 have extensions 11 of substantial length thereon.

The extensions 11 are formed in the finished guard so as to extend inside of the guard in a manner as will presently appear, while the extensions 10 on the sides 7 and 8 are bent laterally from the sides toward each other as is clearly shown in Fig. 3 to form the ends 9 in cooperation with the strip 12 having the ends returned toward each other as clearly shown in Fig. 2. The strips 12 are so formed that the turned end extends inside of the extensions 10 on the side, while the central portion of the strip overlies the outside of these ends, and forms the completed ends 9 of the guard.

The extensions 11 are directed upwardly along the inside of the ends 9 as shown in Fig. 2, while the free end portions are extended inwardly and downwardly toward each other in inclined relation as shown in Fig. 2 at 13 to form wire guides from the electric wires for both service and load sides of the line as indicated at 14.

Cooperating guides are formed on the outer edges or the upper edges in the finished form of the guard by the extensions 15 which are folded inwardly along the sides 7 and 8, from the dotted line indicated at 16 in Fig. 6, forming the upper edge of this guard member. The end portions are extended inwardly from the dotted lines 17 toward each other and inclined in substantially parallel relation to the inclined portions 13 of the extensions 11. The ends of the extensions 15 are in spaced parallel relation with respect to the ends 13 of the extensions 11, so as to receive a pair of felt strips 18 between which the wires 14 extend, and which guide the wires into and out of the guard member as clearly shown in Fig. 2. The felt strips 18 further protect the wires from engagement with the metal from which the guard is formed so there will be no chafing of the insulation and tendencies to short circuit are materially reduced or eliminated.

The central portion of the sides 7 and 8 are formed with extensions 19 which are bent inwardly along the sides 7 and 8 as shown in Fig. 4 from the line indicated in dotted lines at 20 in Fig. 6. This provides for a substantially strong securing lug on the forward side of the guard member which is formed with an opening to receive the sealing pin 21 of the electric meter which receives the sealing wire 22 and the seal 23. The screw member 24 extends through openings in the front and rear walls of the guard member to secure the guard member in rigid connection with the base 1 mounting the meter, while suitable openings 25 are adapted to receive the seal wire 22 in interlocked relation in such a manner that this sealing wire may extend through the slot in the head of screw 24 as clearly shown in Fig. 1.

In providing this guard member in this construction, it may be readily fitted over the lower end of the extension 4 of the electric meter and the same seal used to seal the parts of the housing of the meter also providing a seal for the guard member by the cooperation of the guard member with the electric meter. The extensions 11 and 15 in providing a guideway for the entry of the electric wires 14 to the meter also provide a support for the felt pads protecting the wires and in addition form a substantial reinforcement for the guard member in extending between the front and rear sides in such a manner that crushing of the guard member is prevented through the stress distributing action of the extensions 11 and 15, and in this way mutilation of the guard is substantially prevented.

With the construction above provided, it will be seen that the guard member has special cooperation with the meter in order to permit the use of the same seal for uniting the meter and the guard member to detect tampering, and that such a guard member will suitably support and prevent access to the terminals of the meters to which the wires are attached so that unauthorized persons may be prevented from stealing current.

Having thus described my invention, what I claim as new is:—

1. A guard for electric meters comprising a one-piece casing formed of sheet metal, having a bottom, end and front and rear walls, said casing having an open upper end, cooperating wire guides formed on the end and front and rear walls of said casing, and extending transversely thereof in spaced relation, and means for securing the casing to the meter, said wire guides forming stress distributing members between the front and rear walls of said casing to prevent mutilation thereof.

2. A guard for electric meters comprising a casing formed of a piece of sheet material having bottom, end, front and rear walls, the upper end of said casing being open, lower wire guides formed on the end walls of said casing and projecting inwardly and downwardly between the front and rear walls thereof, upper wire guide projections formed on the front and rear walls of said casing and projecting inwardly in the casing in spaced relation from the lower wire guides, and wire protecting means carried by said upper and lower wire guides, said casing having the upper end fitted over and secured to an electric meter, said meter in the assembled relation of the guard thereon preventing access to the interior thereof and said guard preventing access to the terminal connections of the meter when applied thereto.

In testimony whereof I affix my signature.

CHARLES J. GILLEN.